Figure 1:
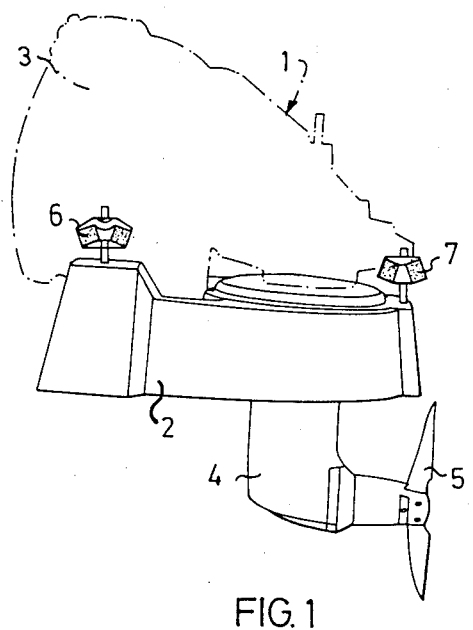

United States Patent [19]
Barkhage

[11] Patent Number: 4,717,130
[45] Date of Patent: Jan. 5, 1988

[54] POWER UNIT SUSPENSION SYSTEM
[75] Inventor: Ralf I. Barkhage, Lerum, Sweden
[73] Assignee: AB Volvo Penta, Goteborg, Sweden
[21] Appl. No.: 877,757
[22] Filed: Jun. 24, 1986
[30] Foreign Application Priority Data
    Jun. 26, 1985 [SE]  Sweden ............................ 8503176
[51] Int. Cl.⁴ .............................................. F16F 7/00
[52] U.S. Cl. .................................. 267/141; 267/141.3; 267/141.7; 267/292; 248/611; 248/616; 248/640
[58] Field of Search ................... 267/141, 141.2, 141.3, 267/141.7, 63 R; 248/560, 611, 616, 632, 634, 640

[56]                References Cited
           U.S. PATENT DOCUMENTS
    2,367,830  1/1945  Kubaugh ........................ 267/141.7
    2,431,931  12/1947 Hall .
    2,705,118  3/1955  Beck .
    2,891,744  6/1959  Hirst et al. .

FOREIGN PATENT DOCUMENTS
    257940   3/1913   Fed. Rep. of Germany ...... 248/634
    647834   7/1937   Fed. Rep. of Germany ...... 248/632
    430584   11/1983  Sweden .
    543917   3/1942   United Kingdom .
    546004   6/1942   United Kingdom .
    603554   6/1948   United Kingdom ................ 267/141
    979145   1/1965   United Kingdom .
    1186672  4/1970   United Kingdom .
    2004621  4/1979   United Kingdom ............. 267/141.2
    2123113  1/1984   United Kingdom .

Primary Examiner—Richard J. Scanlan, Jr.
Attorney, Agent, or Firm—Young & Thompson

[57]                ABSTRACT

The invention relates to a shock and vibration damping suspension system for mounting a power unit in relation to an engine bed or the like. The power unit comprises a motor or engine and a power transmission arrangement coupled thereto, preferably an inboard-outboard drive for watercraft. The suspension system includes suspension elements which are mounted between the power unit and the engine bed and are provided with damping devices made of resilient material. The invention is characterized in that the suspension elements located in parts of the power unit which, in operation are subjected to lifting forces, are of a first kind where the damping device is subjected to compression and shear forces under the influence of the lifting forces, while the suspension elements located in remaining parts of the power unit are of a second kind where the damping device is subjected to compression and shear forces under the influence of downwardly acting forces.

4 Claims, 3 Drawing Figures

POWER UNIT SUSPENSION SYSTEM

The invention relates to a suspension system for mounting a power unit in relation to an engine bed or the like and for damping shock and vibration forces, the power unit comprising an engine or motor and a power transmission arrangement connected thereto, preferably an inboard-out-board drive for water craft, and the suspension system comprising suspension elements mounted between the power unit and the engine or motor bed and provided with resilient damping devces.

Suspension systems of this kind are well known and are used in many connections for mounting power units in a manner to prevent shock forces and vibration forces from being transmitted from the power unit to the engine bed or to the construction supporting the power unit. The suspension elements or mountings used to dampen shock and vibration forces are normally constructed so as to be compressed when subjected to normal loads, i.e. loads resulting from the weight of the power unit and possibly also reaction forces from the tranmission arrangement, and therewith subject the damping devices to compression and shear forces. It is true that these known suspension elements are able to absorb some loads acting in the opposite direction, but in so doing the leastic or resilient material incorporated in the damping devices is subjected to tensile and shear loads, which are loads of a far more demanding character and result in a marked decrease in the active life of the suspension elements.

Suspension systems of this kind are also used for power units intended for watercraft and including a power transmission arrangement in the form of an inboard-outboard drive which is connected to the engine or motor and which extends down through a hole in the engine bed and through an aperture in the bottom of the craft, so as to project therefrom. In the case of a power unit of this kind the driving force from the propeller connected to the inboard drive gives rise to a force which acts upwardly on the suspension elements located in the forward part of the power unit as seen in the forward direction of propulsion. When these upwardly acting forces on the suspension elements are greater than the downwardly acting forces resulting from the weight of the power unit, the suspension elements, or mountings, are subjected to a lifting force which results in tensile and shear forces in the damping devices. This gives rise to the aforementioned drawbacks.

The object of this invention is to provide a suspension system of the kind mentioned in the introduction, with which the aforementioned drawbacks are avoided and which increases the active length of life of the suspension devices and, in addition, enables the power unit to be secured more securely in relation to the engine bed. This is achieved by means of the present invention, in accordance with which the suspension elements present in parts of the power unit subjected to lifting forces in operation are of a first kind, where the damping device is subjected to compression and shear loads under the influence of the lifting force, while the suspension elements present in remaining parts of the power unit are of a second kind where the damping device is subjected to compression and shear loads under the influence of downwardly acting forces.

A suspension or mounting system constructed in accordance with the invention results in the longest possible useful life span of the various suspension elements, while at the same time ensuring that the power unit is positively secured to the engine bed or the surface supporting the power unit.

Figure 2:
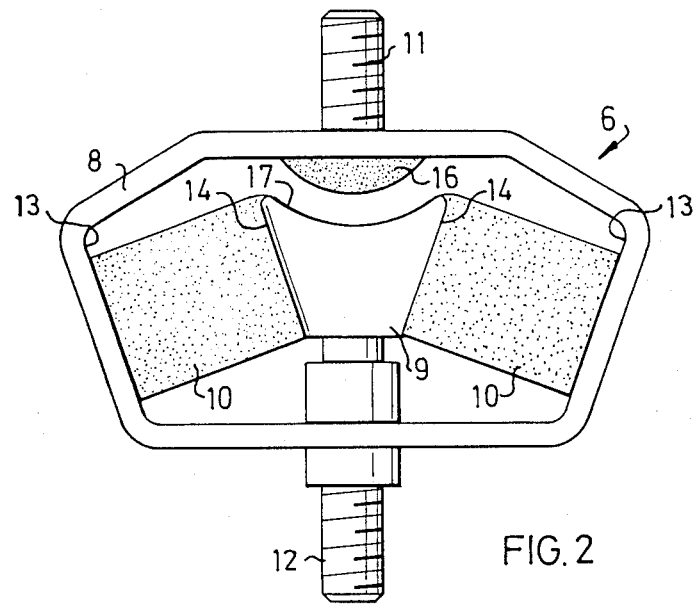
Figure 3:
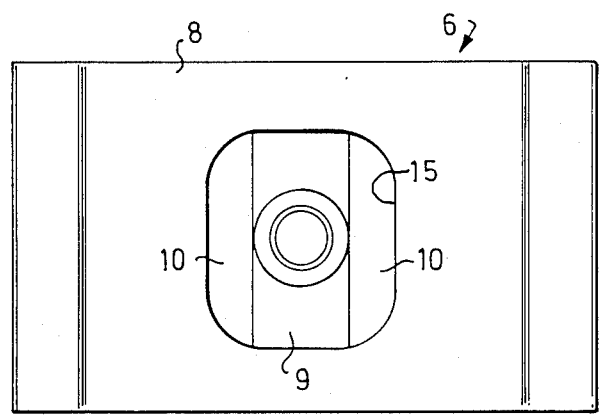

The invention will now be described in more detail with reference to the accompanying drawings, in which FIG. 1 is a schematic side view of a power unit connected to an engine bed by means of a suspension system or mounting system according to one embodiment of the invention;

FIG. 2 is a side view of a suspension element for use in the suspension system illustrated in FIG. 1; and FIG. 3 is a bottom plan view of the suspension element illustrated in FIG. 2.

FIG. 1 illustrates schematically an exemplifying embodiment of a power unit 1 mounted in relation to an engine or motor bed 2 with the aid of a suspension system according to the invention. The power unit 1 illustrated in FIG. 1 includes an internal combustion engine 3, which is only schematically indicated, and a power transmission arrangement 4 connected to the engine 3, said transmission arrangement having the form of an inboard-outboard drive intended for propelling watercraft. In this respect, the inboard-outboard drive is passed through an opening in the engine bed, which is mounted on the bottom of the craft, this bottom also having an opening through which the drive projects. The end of the drive located externally of the bottom of the craft is provided with a propeller 5 for propelling the craft.

The power unit 1 is mounted in relation to the engine bed 2 by means of suspension elements 6 located at the forward end of the power unit 1, as seen in the direction of craft propulsion, and suspension elements 7 located at the rearward end of the power unit. In operation, the propeller 5 exerts on the power unit 1 a torque which gives rise to a lifting force acting upwardly on the suspension element 6 and a force which acts downwardly on the suspension element 7. When the upwardly acting force on the suspension element 6 exceeds the downwardly acting force on the suspension element 6 caused by the weight of the power unit 1, the suspension element 6 is subjected to a tensile force, while the suspension element 7, under normal operating conditions, is solely subjected to compression forces.

In order to provide the best possible conditions for the absorption of tensile forces, each suspension element 6 is constructed in accordance with the illustration shown in FIGS. 2 and 3, said each suspension element 6 being so positioned as to be subjected to lifting forces or tensile forces in operation. Each of the suspension elements 7 on the other hand, has the form of a conventional suspension element, said elements being so positioned as to be subjected solely to downwardly acting forces or compression forces in operation.

Each suspension element 6 comprises a first fastener element 8, a second fastener element 9 and a damping element 10 arranged between the first and second fastener elements. As will be best seen from FIG. 2, the first fastener element 8 has the form of a closed stirrup-like structure, substantially of trapezoidal configuration. The second fastener element 9 has the form of a wedge-shaped member and is arranged within the first fastener element 8. The first fastener element 8 is provided with an outwardly projecting mounting peg 11, for mounting the suspension element 6 on the power unit 1. Correspondingly, the second fastener element 9 is provided with an outwardly projecting mounting peg 12, for mounting the suspension element 6 in the engine bed 2. The two mounting pegs 11 and 12 are substantially in line with one another and are intended to be arranged in the directional path of the forces acting on the suspension element 6.

The first fastener element 8 incorporates therewithin two abutment surfaces 13, which are substantially planar and symmetrically arranged in relation to a plane extending parallel with the directional path of the forces acting on the suspension element 6, i.e. substantially in the axial direction of the mounting pegs 11 and 12. The abutment surfaces 13 extend obliquely in relation to the force direction, so as to form angles with one another and to converge in a direction away from the mounting peg 11. Correspondingly, the second fastener element 9 incorporates two abutment surfaces 14, which are substantially planar and arranged symmetrically in relation to the aforesaid plane. The abutment surfaces 14 are obliquely positioned in a corresponding manner to the abutment surfaces 13, and extend substantially parallel with said surfaces 13. This means that the damping devices 10, which are joined to the abutment surfaces 13 and 14, can comprise substantially parallelepipedic pieces of a resilient material, such as rubber or a plastic material having similar shock and vibration damping properties. The damping devices 10 are suitably glued or vulcanized to the abutment surfaces 13 and 14 respectively. By this arrangement, when power unit 1 moves mounting peg 11 upwardly away form mouting peg 12, thereby tensioning suspension element 6, damping devices 10 are compressed between surfaces 13 and 14.

As will be seen from FIG. 3, the mounting peg 12 on the second fastener element 9 extends through an opening 15 in the first fastener element 8. As a result of this arrangement the second fastener element 9 can move horizontally in relation to the first fastener element 8 only to the extent determined by the size of the opening 15. Thus, this restricts the extent to which the power unit 1 is able to move under the influence of abnormal forces, for example, collision forces. In addition, the arrangement also prevents excessive movement between the two fastener elements 8 and 9 in the event of fracture of failure of the damping devices 10.

In order to avoid direct metallic contact between the two fastener elements 8 and 9, the first fastener element 8 is provided on its inner surface, opposite the mounting peg 11, with an abutment device 16 made of a resilient material, such as rubber or some plastic material of suitable elastic properties. When the suspension element 6 is subjected to a downwardly acting force, the abutment device 16, subsequent to a pre-determined movement, is intended to be brought into abutment with the upper surface 17 of the second fastener element 9. In order to achieve alignment in this regard the abutment device 16 is given a convex abutment surface, whereas the upper surface 17 on the second fastener element 9 is given a concave surface such as to fit within the abutment surface on the abutment device 16.

It will be appreciated that the invention is not restricted to the aforedescribed embodiment and that modifications can be made within the scope of the following claims.

I claim:

1. In a power unit (1) for an inboard-outboard drive for boats having an engine bed (2), the power unit (1) including an engine (3) and a power transmission (4) connected to the engine for driving a propeller (5), and a suspension system for the engine (3) on the engine bed (2), said suspension system comprising suspension elements (6, 7), therebeing a said suspension element (7) supporting a rear portion of the engine (3) in compression between the engine and the engine bed (2) and a forward suspension element (6) between a forward portion of the engine (3) and the engine bed (2) which is in compression between the engine (3) and the engine bed (2) when the engine (3) is not operating but is in tension between the engine (3) and the engine bed (2) under the thrust of the propeller (5) when the engine (3) is operating; the improvement in which in said forward suspension element (6) comprises two fastener means (8, 9) one connected to the engine (3) and the other to the engine bed (2), mutually parallel abutment surfaces (13, 14) on the two fastener means (8, 9), said abutment surfaces being substantially flat and symmetrically arranged at an angle to a plane which is disposed parallel to the direction in which the engine (3) tensions the forward suspension element (6), and damping means (10) between said abutment surfaces (13, 14), said fastener means (8, 9) being so connected to said engine bed (2) and said engine (3) as to move said abutment surfaces (13, 14) toward each other to compress said damping means (10) when said engine (3) subjects said forward suspension element (6) to tension.

2. Structure as claimed in claim 1, in which one (8) of said fastener means (8, 9) has the form of a closed stirrup-like structure in which said abutment surfaces (13) comprise two internal surfaces of said stirrup-like structure, and the other (9) said fastener means has the form of a wedge-shaped member, the wedge surfaces of which form said abutment surfaces (14), the wedge-shaped member being disposed within the closed stirrup-like structure and having a peg (12) which projects out through an opening in said stirrup-like structure and is secured to one of said engine bed (2) and said engine (3).

3. Structure as claimed in claim 2, in which said peg (12) is secured to the engine bed (2).

4. Structure as claimed in claim 2, and resilient abutment means (16) disposed between said stirrup-like structure (8) and said wedge-shaped member (9) and normally spaced from a coacting abutment surface (17) when said forward suspension element (6) is free from stress and adapted yieldably to limit the movement of said abutment surfaces (13, 14) away from each aother by coming into abutment with said abutment surface (17).

* * * * *